(12) United States Patent
Karve et al.

(10) Patent No.: US 11,163,683 B2
(45) Date of Patent: Nov. 2, 2021

(54) DYNAMICALLY ADJUSTING PREFETCH DEPTH

(71) Applicant: International Business Machines Corporation, Armonk, NY (US)

(72) Inventors: Mohit Karve, Austin, TX (US); Edmund Joseph Gieske, Cedar Park, TX (US); Vivek Britto, Austin, TX (US); George W. Rohrbaugh, III, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/528,917

(22) Filed: Aug. 1, 2019

(65) Prior Publication Data
US 2021/0034529 A1 Feb. 4, 2021

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
CPC ........................ G06F 12/0862; G06F 2212/602
See application file for complete search history.

(56) References Cited

U.S. PATENT DOCUMENTS

| | | | |
|---|---|---|---|
| 7,047,374 B2 | 5/2006 | Sah et al. | |
| 7,836,259 B1 | 11/2010 | Filippo et al. | |
| 8,001,363 B2 | 8/2011 | Shihadeh | |
| 8,291,171 B2 | 10/2012 | Rallens et al. | |
| 8,347,039 B2 | 1/2013 | Boyle et al. | |
| 9,304,773 B2 | 4/2016 | Scott et al. | |
| 9,378,144 B2 | 6/2016 | Dodson et al. | |
| 9,384,136 B2 | 7/2016 | Dodson et al. | |
| 9,846,627 B2 | 12/2017 | Solihin et al. | |
| 10,191,847 B2 | 1/2019 | Drerup et al. | |
| 2005/0289301 A1 | 12/2005 | Woo et al. | |
| 2006/0179239 A1* | 8/2006 | Fluhr | G06F 12/0862 711/137 |

(Continued)

OTHER PUBLICATIONS

IBM, "Data prefetch optimization for AIX systems on POWER architecture", printed Apr. 16, 2019, 3 pages.

(Continued)

*Primary Examiner* — Kalpit Parikh
(74) *Attorney, Agent, or Firm* — Daniel M. Yeates (57) ABSTRACT

Disclosed is a computer implemented method to dynamically adjust prefetch depth, the method comprising sending, to a first prefetch machine, a first prefetch request configured to fetch a first data address from a first stream at a first depth to a lower level cache. The method also comprises sending, to a second prefetcher, a second prefetch request configured to fetch the first data address from the first stream at a second depth to a highest-level cache. The method further comprises determining the first data address is not in the lower level cache, determining, that the first prefetch request is in the first prefetch machine, and determining, in response to the first prefetch request being in the first prefetch machine, that the first stream is at steady state. The method comprises adjusting, in response to determining that the first stream is at steady state, the first depth.

15 Claims, 6 Drawing Sheets

(56) References Cited

U.S. PATENT DOCUMENTS

| | | |
|---|---|---|
| 2009/0199190 A1 | 8/2009 | Chen et al. |
| 2010/0293339 A1* | 11/2010 | Arimilli .............. G06F 12/0862 711/137 |
| 2011/0173397 A1 | 7/2011 | Boyle et al. |
| 2012/0311270 A1 | 12/2012 | Sun et al. |
| 2016/0139829 A1 | 5/2016 | Sanzone et al. |
| 2019/0065377 A1 | 2/2019 | Lee et al. |

OTHER PUBLICATIONS

Honarmand, N., "Memory Prefetching", Spring 2015, CSE 502—Computer Architecture, Stony Brook University, 30 pages.

Karve et al., "Dynamically Adjusting Prefetch Depth", U.S. Appl. No. 16/528,901, filed Aug. 1, 2019.

List of IBM Patents or Patent Applications Treated as Related, dated Aug. 1, 2019, 2 pages.

Jouppi, N., "Improving Direct-Mapped Cache Performance by the Addition of a Small Fully-Associative Cache and Prefetch Buffers", IEEE, 1990, pp. 388-397.

Lee et al., "When Prefetching Works, When it Doesn't, and Why", ACM Transactions on Architecture and Code Optimization, vol. 9, No. 1, Article 2, Publication date: Mar. 2012, 29 pages.

Anonymous, "Mechanism to Decrease Cold Cache Startup Effects in Instruction Cache Prefetching", An IP.com Prior Art Database Technical Disclosure, IP.com No. IPCOM000248538D, IP.com Electronic Publication Date: Dec. 14, 2016, 7 pages.

Anonymous, "Simultaneous Data Prefetch Request Probing and Recycled Data Forwarding from a Load Store Unit", An IP.com Prior Art Database Technical Disclosure, IP.com No. IPCOM000221102D, IP.com Electronic Publication Date: Aug. 29, 2012, 7 pages.

* cited by examiner

FIG. 1

| Stream ID | 0 | 1 | 2 | 3 | 4 | 5 | 6 | 7 |
|---|---|---|---|---|---|---|---|---|
| Valid | 1 | 0 | 0 | 1 | 1 | 1 | 1 | 1 |
| Depth | 8 | 12 | 8 | 4 | 8 | 12 | 16 | 8 |
| Last Prefetch | 10 | 50 | 200 | 20 | 400 | 200 | 600 | 100 |
| Address | A | B | C | D | E | F | G | H |

DYNAMICALLY ADJUSTING PREFETCH DEPTH

BACKGROUND

The present disclosure relates to prefetching, and, more specifically, to dynamically adjusting prefetch depth.

In many modern computing systems, one or more processors working together can run multiple applications (e.g., programs) simultaneously. To execute a program, the operating system, in simple terms, receives system calls from an application, then directs the processor to fetch the data to be processed, processes the data per the instructions (e.g., code), then writes the processed data to a storage location. Many versions of modern architecture use multiple levels of memory to increase the efficiency of the overall system. There is a long-term storage, usually larger capacity but relatively slow, and one or more levels of short-term storage (e.g., random access memory RAM, cache, etc.) that are much faster but can have a relatively small capacity. Modern memory systems may also include prefetchers, that predict and fetch data to be processed so it arrives in the cache before it is needed.

SUMMARY

Disclosed is a computer implemented method to dynamically adjust prefetch depth, the method comprising sending, to a first prefetch machine, a first prefetch request, wherein the first prefetch request is configured to fetch a first data address from a first stream at a first depth to a lower level cache. The method also comprises sending, to a second prefetcher, a second prefetch request, wherein the second prefetch request is configured to fetch the first data address from the first stream at a second depth to a highest-level cache. The method further comprises determining the first data address is not in the lower level cache, determining, in response to the first data address not being in the lower level cache, that the first prefetch request is in the first prefetch machine, wherein the first prefetch machine is one of a plurality of prefetch machines, and determining, in response to the first prefetch request being in the first prefetch machine, that the first stream is at steady state. The method comprises adjusting, in response to determining that the first stream is at steady state, the first depth. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. These do not limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to prefetching, and, more specifically, to dynamically adjusting prefetch depth. Aspects of the present disclosure may be better appreciated in light of the aforementioned applications.

In many modern computing systems, one or more processors working together can run multiple applications (e.g., programs) simultaneously. To execute a program, the operating system, in simple terms, receives system calls from an application, then directs the processor to fetch the data to be processed, processes the data per the instructions (e.g., code), then writes the processed data to a storage location. Many versions of modern architecture use multiple levels of memory to increase the efficiency of the overall system. There is a long-term storage, usually larger capacity but relatively slow, and one or more levels of short-term storage (e.g., random access memory RAM, cache, etc.) that are much faster but can have a relatively small capacity—the different levels making various tradeoffs of size for speed. For purposes of this disclosure, the short-term, faster memory will be referred to as a cache(s) (or memory cache). In general, it takes more time to fetch data from long term storage to the processor than it takes to process the data. The time while a processor is waiting for data is called latency. Latency may also refer to a delay in the transmitting or processing of data. Embodiments of the present disclosure address the fact that reducing latency can increase the overall efficiency of a computing system. Latency can be reduced using caches and prefetching.

Embodiments of the present disclosure also address the fact that prefetching data can increase the overall efficiency of the computing system and/or reduce latency. Data prefetching is a process by which the computing system attempts to predict future data that will be executed based on current instructions, current data, historical usage, and other similar factors, and then reading the future data into the cache in anticipation of a request to do so. If timed correctly, the data will be read into a cache just prior to the processor requesting it, akin to a just-in-time model. Ideally, the processor will retrieve the data from a cache as it is needed, rather than waiting for the system to fetch the data from a long term storage.

Data address based prefetchers analyze the sequence of data accesses performed by a workload and try to discern a pattern based on which they can make predictions of future line usage and prefetch those lines. Two related aspects of such prefetchers are the ramp and the depth. The ramp defines the rate at which a prefetch stream approaches the maximum depth. The depth defines the distance of the furthest prefetch in steady state from the current demand access. For example, if a stream has a maximum depth of sixteen, that means that for every address X that is observed as a demand, the prefetcher will prefetch up to the $X+16^{th}$ line from the current X.

In some embodiments, the depth is selected from a set of one or more options at the time that the prefetch stream is allocated and remains fixed at that value for the lifetime of that stream. This can have a detrimental effect on the total overall prefetching system. In some embodiments, the prefetcher can identify more lines of data to prefetch than there are resources allocated to the prefetch system.

In this case, the prefetch steam that was first allocated will get the full benefit of the prefetching system while later allocated streams will suffer delays due to lack of computing resources. For example, if there are three streams allocated for prefetching, but the prefetcher can only prefetch 12 lines ahead total. Two of the streams can be prefetching at X+6 while the third will get no benefit. The overall system efficiency would be higher if the all three streams were allocated at X+4 such that all would get the benefits of prefetching.

Embodiments of the present disclosure adaptively alter the depth of one or more prefetch streams. The altering can include decreasing the depth of a stream that is over utilizing resources, increasing the depth of a stream that is under-utilizing, and/or otherwise evenly distributing resources such that more streams can benefit from prefetching. In some embodiments, the depth of individual streams can be altered while other streams are not changed. In some embodiments, the altering occurs with no user interaction, e.g., the altering occurs automatically and/or dynamically based on current system usage.

A prefetch machine is a dedicated set of resources configured to track a prefetch request as it is sent to and returned from a memory (or a lower level cache). An inflight prefetch is a request that has been identified by the prefetcher as a possibly desirable line of data, but not sent out to memory. One prefetch machine can store one inflight prefetch. Once the prefetch is complete, the prefetch machine is released, and a subsequent prefetch is allocated to the machine. However, there may be more prefetches inflight, (or prefetches ready to be sent to a prefetch machine) than available prefetch machines.

Embodiments of the present disclosure analyze when the number of inflight prefetches exceeds the number of available prefetch machines and adaptively reduces the depth of some or all streams in the prefetcher, and/or prevents a streams from increasing their prefetch depth.

Embodiments of the present disclosure determine the number of prefetch machines that are being utilized. The determination can be based on comparing the number of inflight prefetches against the number of prefetch machines. In some embodiments, the number of prefetches inflight are estimated. For example, one approximation of the number of prefetches in flight is determined by adding the maximum depth of all the valid streams with an optional safety factor. In some embodiments, the number of prefetches in flight are counted based on request sent out and request received. Various criterion can be applied to streams to determine when they are valid (e.g., cycles since last prefetch). In some embodiments, the number of prefetches in flight is based on a direct data link between the cache where the prefetch machines reside and a counter in the prefetch system. The difference between inflight prefetches and the number of prefetch machines can be used as a basis for how to allocate prefetching resources in the computing device.

In some embodiments, a multi-level prefetching system is utilized. In these embodiments, the prefetcher will aggressively prefetch highly speculative accesses into the larger lower level cache. In parallel, a second set of prefetches generated by the same prefetch stream will prefetch less speculative accesses into the highest-level cache from the lower level cache. This will result in a higher number of hits in the highest level of cache thereby reducing the overall latency of the system. Highly speculative and less speculative represent relative likelihood the prefetched code will be used in the near term.

Ideally, the depth of the lower level prefetch (e.g., X+16) is higher than the depth of the higher level prefetch (X+4), so the highest level will hit the data in the lower level cache. If the lower level cache suffers a miss because the lower level prefetch was not sent out early enough it will still be inflight or not yet otherwise completed when the higher level prefetch is initiated. This mismatch in timing can make the multi-level prefetching system ineffective.

Embodiments of the present disclosure identify when the higher level prefetch misses the lower level cache and/or hits in a lower level prefetch machine. In these embodiments, the prefetch system adaptively increases the depth of the lower level prefetch in response to the miss. In some embodiments, the prefetch system also ensures the prefetch stream is in a steady state before changing the prefetch depth. Steady state is when a stream is fetching at its defined depth.

The aforementioned advantages are example advantages, and embodiments exist that can contain all, some, or none of the aforementioned advantages while remaining within the spirit and scope of the present disclosure.

Figure 1:
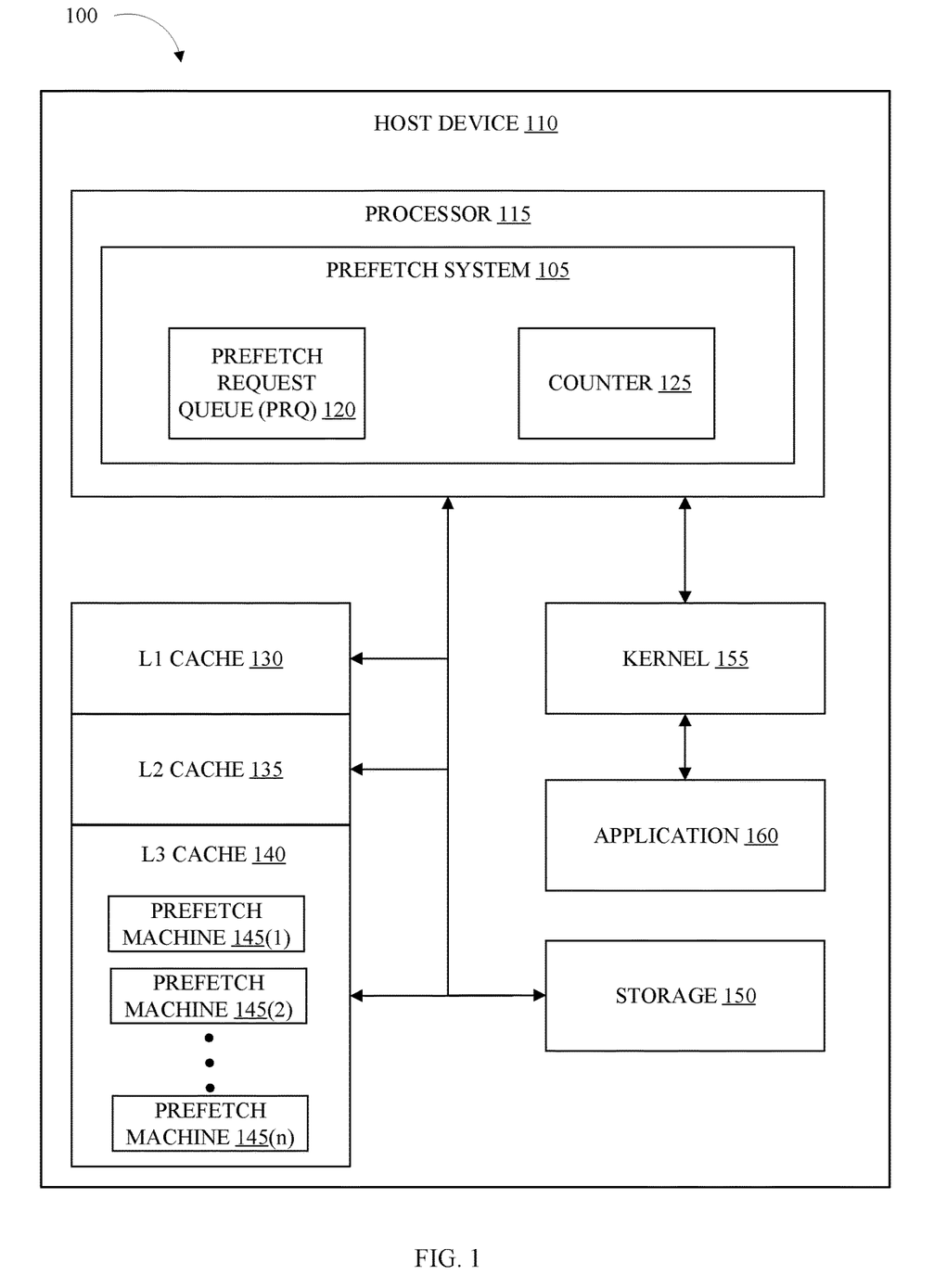
FIG. 1 is a functional diagram that illustrates a computing environment suitable for operation of prefetch system, in accordance with some embodiments of the present disclosure.

Referring now to various embodiments of the disclosure in more detail, FIG. 1 is a representation of a computing environment 100, that is capable of running prefetch system 105, in accordance with one or more embodiments of the present disclosure. Many modifications to the depicted environment may be made by those skilled in the art without departing from the scope of the disclosure as recited by the claims.

Computing environment 100 includes host device 110. Host device 110 can be a standalone computing device, a management server, a web server, a mobile computing device, or any other electronic device or computing system capable of receiving, sending, and processing data. In other embodiments, host device 110 can represent a server computing system utilizing multiple computers as a server system, such as in a cloud computing environment. In some embodiments, host device 110 represents a computing system utilizing clustered computers and components (e.g., database server computers, application server computers, etc.) that act as a single pool of seamless resources when accessed within computing environment 100. In some embodiments host device 110 includes processor 115, L1 cache 130, L2 cache 135, L3 cache 140, storage 150, kernel 155, and application 160.

Processor 115 can be any combination of hardware and/or software configured to execute program instructions provided by an application (e.g., application 160). In some embodiments, processor 115 is comprised of two or more processors (or cores) working in unison. In some embodiments, processor 115 can perform operations including, reading data from memory (e.g., storage 150), writing data to memory processing data, fetching data, prefetching data, etc. Processor 115 can be communicatively coupled to other components within host device 110. In some embodiments, processor L1 cache 130, L2 cache 135, L3 cache 140, storage 150, and kernel 155. In some embodiments, processor 115 includes prefetch system 105.

Prefetch system 105 can be any combination of hardware and/or software configured to prefetch data from one storage area (e.g. storage 150) to higher tier storage area (e.g., L1 cache 130, L2 cache 130, L3 cache 140, etc.). In various embodiments, prefetch system 105 predicts future data that will be executed based on current instructions, current data, historical usage, and other similar factors, and then reading the future. Prefetch system 105 can be tuned such that the data is received at the highest-level cache (e.g. L1 cache 130) shortly before it is requested by processor 115.

In some embodiments, prefetch system 105 includes two or more tiers (or levels) of prefetchers. For example, a higher level cache (e.g., L1 cache—a faster cache) can fetch data from a lower level cache (e.g., L2 cache 135, L3 cache 140, etc.—slower caches) to the highest-level cache (e.g. L1 cache 130) and a lower level prefetcher can fetch data from any lower level memory (e.g. storage 150) to any higher level memory other than the highest level cache. Prefetch system 105 can include prefetch request queue 120 (PRQ 120) and counter 125.

PRQ 120 can be any combination of hardware and/or software configured to store data relating to prefetch streams. In some embodiments, PRQ 120 stores data that can be used and updated by prefetch system 105 to carry out the prefetching process. The data can include a stream identifier, whether the streams are valid, stream prefetch depth, time/cycles since last prefetch, current data address, one or more associated addresses and/or other relevant information. One embodiment of a PRQ 120 is further describe in FIG. 2 below.

Counter 125 can be any combination of hardware and/or software configured to track prefetches. In some embodiments, counter 125 is configured to track to the number of prefetch machines 145 available and/or the number of prefetch machines 145 in use. It can track the machines by using data in PRQ 120, by counting requests and responses, and/or by constant monitoring.

In some embodiments, counter 125 tracks prefetch machines 145 by estimating. In these embodiments, counter checks PRQ 120 for the maximum depths of all valid streams and adds them together. This will provide the maximum number of prefetch machines 145 that may be in use.

In some embodiments, counter 125 tracks the number of available prefetch machines by counting requests and responses. In these embodiments, each time a request for a prefetch is sent out, counter 125 adds one to the number of machines in use. Each time a request is completed, counter 125 subtracts one from the number of machines in use. It is possible to have the number of requests be greater than number of prefetch machines 145.

In some embodiments, counter 125 tracks the number of available prefetch machines by continuously monitoring L3 cache 140. In these embodiments, there is a direct communication link between L3 cache 140 and counter 125. Counter 125 is continuously aware when each prefetch becomes inflight, is sent to storage 150, and is read into L3 cache 140.

The various methods of tracking the number of available prefetch machines have different costs and different accuracy. Generally, continuously monitoring is more accurate but more resource intensive than counting requests and responses, and counting request and responses is more accurate but more resource intensive than estimating. Various embodiments of the present disclosure can use one or more of the methods of tracking in one or more ways. For example, a higher level prefetcher can use continuous monitoring, and a lower level prefetches can use estimating.

L1 cache 130 can be any combination of hardware and/or software that stores data to be processed. Generally, a cache is a smaller but faster data storage system when compared to long term storage (e.g., storage 150). In some embodiments, L1 cache 130 is the top-level (top tier, higher level) cache. The top-level cache is the cache with the smallest latency when being utilized by processor 115. In some embodiments, L1 cache 130 can prefetch data from L3 cache 140.

L2 cache 135, can be any combination of hardware and/or software that stores data to be processed. In some embodiments, L2 cache 135 has a larger capacity than L1 cache 130 and a smaller capacity than L3 Cache 140.

L3 cache 140, can be any combination of hardware and/or software that stores data to be processed. In some embodiments, L3 cache is the lowest level cache. The lowest level cache is the cache that is closest to long term memory (e.g. storage 150). In some embodiments, L3 cache 140 has the largest capacity of any cache in host device 110. In some embodiments, L3 cache 140 includes a plurality of prefetch machines 145(1), 145(2) up to 145($n$), where n is an integer index, collectively referred to as prefetch machines 145.

Prefetch machines 145 can be any combination of hardware and/or software configured to track inflight prefetches until they are fulfilled. In some embodiments, prefetch machines 145 are included in L3 cache 140. In some embodiments, L1 cache 130 and/or L2 cache 135 may include one or more prefetch machines. In some embodiments, the number of prefetch machines is constant within L3 cache 140 and/or host device 110.

A prefetch machine can be a set of dedicated resources inside a cache. Each prefetch machine can store one prefetch at a time. Once the prefetch is complete, the machine is released and another prefetch is designated to that specific prefetch machine. In some embodiments, PRQ 120 sends prefetch request to prefetch machines 145.

In various embodiments, host device 110 includes one or more additional levels of cache or one or more fewer levels of cache and/or storage. In various embodiments, processor 115 and/or kernel 155 manage data flow into and between L1 cache 130, L2 cache 135, and/or L3 cache 140.

Storage 150 can be any combination of hardware and/or software configured to store data. In some embodiments, storage 150 stores the programs and instructions to operate and manage prefetch system 105, host device 110, kernel 155, application 160, and/or any other programs or modules configured to operate in host device 110. Storage 150 may be communicatively coupled to other components within host device 110.

Kernel 155 can be any combination of hardware and software capable of managing the workload of host device 110 and provide access to low-level operating components of the host device 110. In some embodiments, kernel 155 receives system calls from one or more applications 160 requesting resources of host device 110. In these embodiments, kernel 155 prioritizes and executes the system calls based on one or more algorithms. In some embodiments, kernel 155 is part of the operating system of host device 110. Kernel 155 can be communicatively coupled to the other components of host device 110. In some embodiments, kernel 155 includes a queue of instructions that are in line to be carried out by a processor 115. In some embodiments, the instructions are load and store instructions (e.g., read, write, etc.).

Application 160 can be any combination of hardware and/or software configured to carry out a function on a computing device (e.g., host device 110). In some embodiments, application 160 is a web application. In some embodiments, application 160 sends system calls to kernel 155 and/or processor 115 and receives the processed results from kernel 155 and/or processor 115. The system call may include a data set. The data set can include the line(s) of code (instructions) to process, the location the code is stored at (instruction address), where/if to write the results, etc. In some embodiments, application 160 is a set of instructions configured to perform one or more tasks. In some embodiments, application 160 is a software program (e.g., accounting software, system backup software, word processor, etc.).

Figure 2:
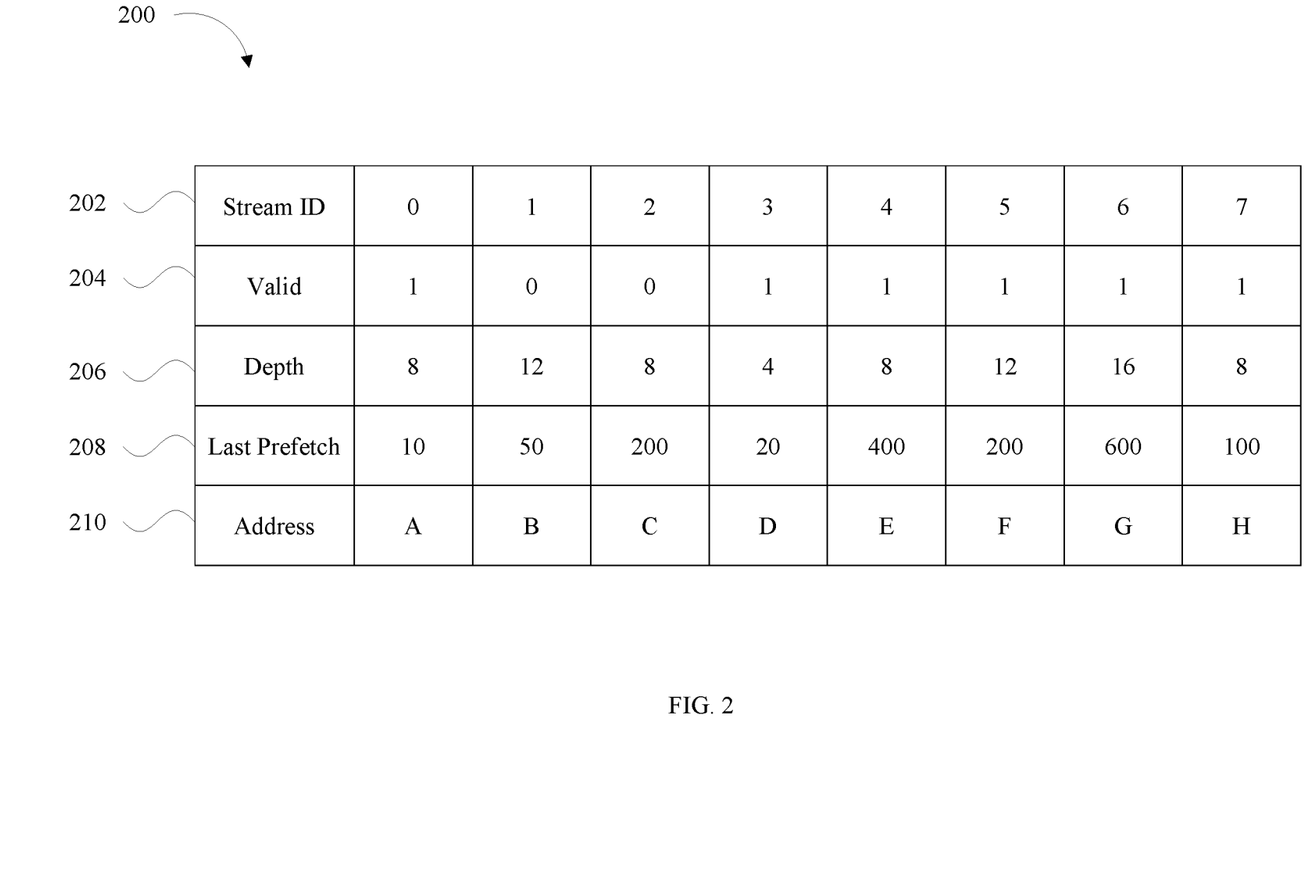
FIG. 2 depicts an example prefetch request queue table, in accordance with some embodiments of the present disclosure.

FIG. 2 is a table 200 of one embodiment of PRQ 120 consistent with various embodiments of the present disclosure. Many modifications to the depicted method may be made by those skilled in the art without departing from the spirit and scope of the present disclosure. In various embodiments, table 200 includes more or less information than is depicted in FIG. 2.

Row 202 includes a stream identifier. The stream identifier (stream ID) can be any data that represents and individual stream. Each stream will have a unique ID. Row 204 shows if a stream is valid. In some embodiments, a Boolean is used to mark a stream valid or invalid. The Boolean can be a number, a letter, one or more bytes, and/or any other data that can signify if a stream is valid. Row 206 includes the current depth of the prefetch.

Row 208 represents the number of cycles since the stream last completed a prefetch. In some embodiments, data in row 208 is used to determine if a stream is still active. The higher the number of cycles since the previous prefetch, the more likely the stream is not being used. Prefetch system 105 can be tuned such that a prefetch for a particular stream will occur before a set number of cycles. Once that number is past, the stream is highly likely to be complete, but prefetch system 105 has not yet invalidated and/or updated PRQ 200.

Row 210 includes one or more data addresses. In some embodiments, the addresses in row 210 include the current data address and one or more associated data addresses. An associated data address that will be prefetched based on the current address.

Figure 3:
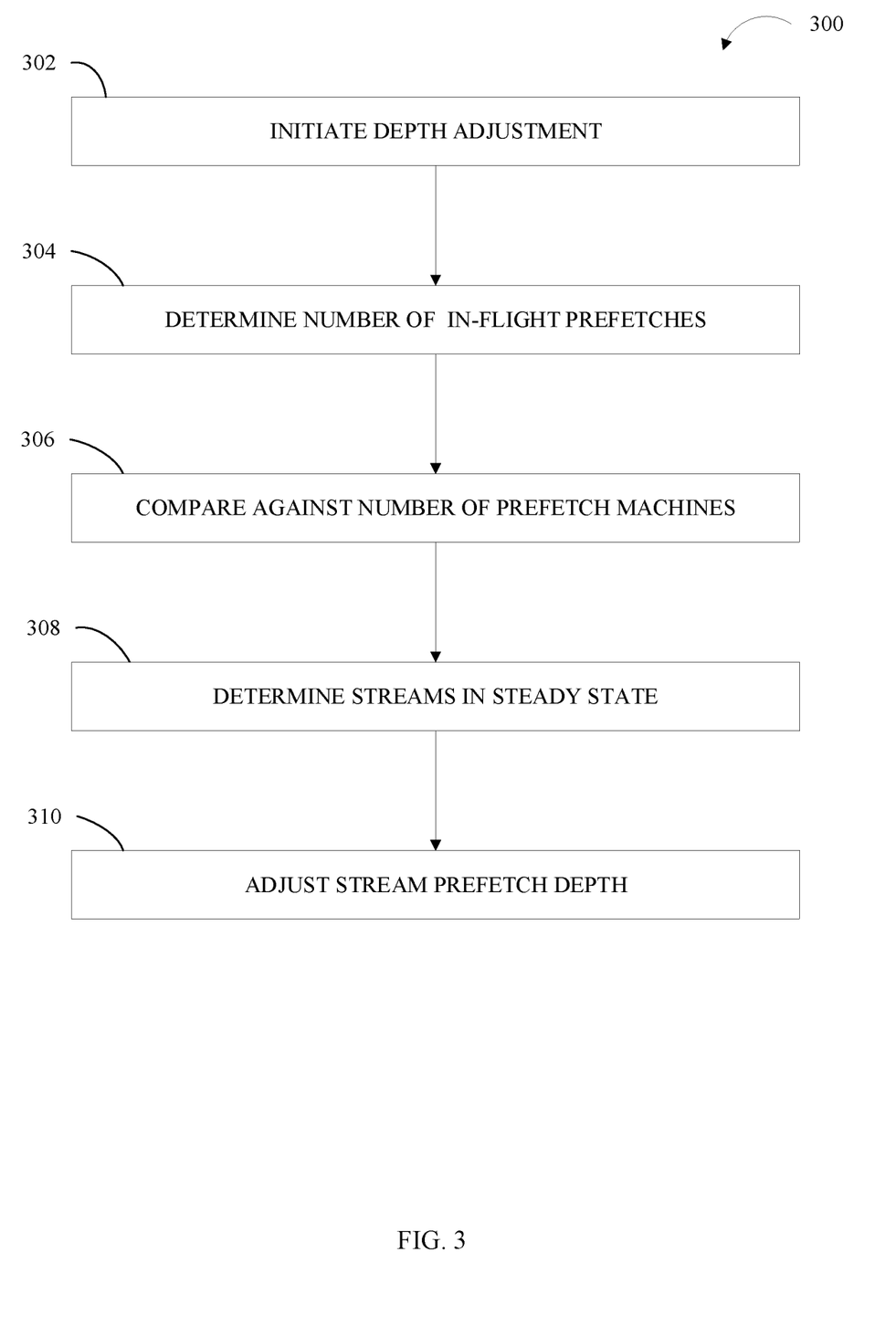
FIG. 3 illustrates a flow chart of an example method of adjusting prefetch depth, in accordance with some embodiments of the present disclosure.

FIG. 3 depicts a flowchart of an example method, method 300, for prefetch system 105 that can be performed in a computing environment (e.g., computing environment 100 and/or host device 110). One or more of the advantages and improvements described above for adjusting prefetch depth can be realized by the method 300, consistent with various embodiments of the present disclosure.

Method 300 can include more or fewer operations than those depicted. Method 300 can include operations in different orders than the order depicted. Likewise, the method 300 can include operations that occur simultaneously rather than sequentially. Many modifications to the depicted method may be made by those skilled in the art without departing from the spirit and scope of the present disclosure. Method 300 can be implemented by one or more processors, a prefetch system (e.g., prefetch system 105 of FIG. 1), a computing device (e.g., host device 110 of FIG. 1), or a different combination of hardware and/or software. In various embodiments, the various operations of method 200 are performed by one or more of prefetch system 105, host device 110, processor 115, PRQ 120, counter 125, L1 cache 130, L2 cache 135 L3 cache 140, prefetch machines 145 and/or kernel 155.

At operation 302, prefetch system 105 initiates depth adjustment. In some embodiments, depth adjustment can be initiated in response to one or more triggers. The trigger can be based on number of cycles (e.g., every 1000 cycles), changes in PRQ 120 (e.g., adding/removing a stream, invalidating a stream, etc.), time, and other similar triggers. In some embodiments, method 300 is continuously operating.

At operation 304 prefetch system 105 determines the number of inflight prefetches. In some embodiments, counter 125 determines the number of prefetches in flight. In some embodiments, the inflight prefetches are determined by continuous monitoring of prefetch machines 145. In some embodiments, the number of inflight prefetches are determined by counting. In these embodiments, counter 125 sets a current inflight variable. Each time a prefetch is requested, it becomes inflight and the variable is incremented by one. Each time a request is completed by L3 cache 140, counter 125 the variable is decremented one. Counter 125 receives notification of the completed request from L3 cache 140 (or one of prefetch machines 145).

In some embodiments, the number of inflight prefetches is determined by estimating the number. In these embodiments, prefetch system 105 adds the maximum depth of all valid current streams. A more detailed discussion of estimating the number of inflight prefetches is provided in reference to FIG. 4. In some embodiments, a buffer factor is used to artificially increase count of prefetches inflight. The buffer can be added to the number determined. The buffer can be adjusted manually or automatically. The buffer can help prevent the allocating of more inflight prefetches than available prefetch machines. They can also keep a small number of prefetch machines available for new streams or to increase the depth of one or more current streams (e.g., method 500).

At operation 306, prefetch system 105 compares the number of inflight prefetches against the number of prefetch machines. In some embodiments, the prefetch machines are prefetch machines 145. In some embodiments, the number of prefetch machines is the number of prefetch machines in L3 cache 140.

At operation 308, prefetch system 105 determines which streams are in steady state. The defined depth can be the depth in PRQ 120. When in steady state, as soon as a line of data N is processed, the N+X line is fetched, where X is the maximum depth.

At operation 310, prefetch system 105 adjusts the depth of one or more streams. In some embodiments, the magnitude and direction of depth is based on the results of operation 306 and/or operation 308. In some embodiments, the depth of one stream can be increased, decreased or held constant. For example, if there are 30 inflight prefetches, and 48 available prefetch machines, a stream can be increased by up to 18 to fully utilize all available prefetch machines. Or, the additional 18 can be split between two or more streams. In some embodiments, if the number of inflight prefetches is greater than, equal to, or slightly less than the number of prefetch machines, prefetch system 105 can prevent an increase in the depth of any streams. "Slightly less than" can mean a set number lower than (e.g., 4 or less, 2 per active stream, etc.), or a percentage (e.g., within 90% of the number of prefetch machines), or according to some other predefined criteria.

In some embodiments, the depth of one or more streams can be increased or decreased. Each stream can be adjusted by a different magnitude. For example, a first stream can be increased from a depth of 10 to 12, while a second stream is increased from a depth of 8 to 12. In some embodiments, the depth of the first stream can be increased and the depth of a second stream can be decreased. For example, a first stream can increase from 8 to 10 and a second stream be decreased from 16 to 12. Increasing the total number of inflight prefetches above the number of available prefetch machines will not further increase the efficiency of the prefetch system. While the inflight prefetch will be stored in PRQ 120 or some other location, there will be no reduced latency for those extra prefetches in flight.

Figure 4:
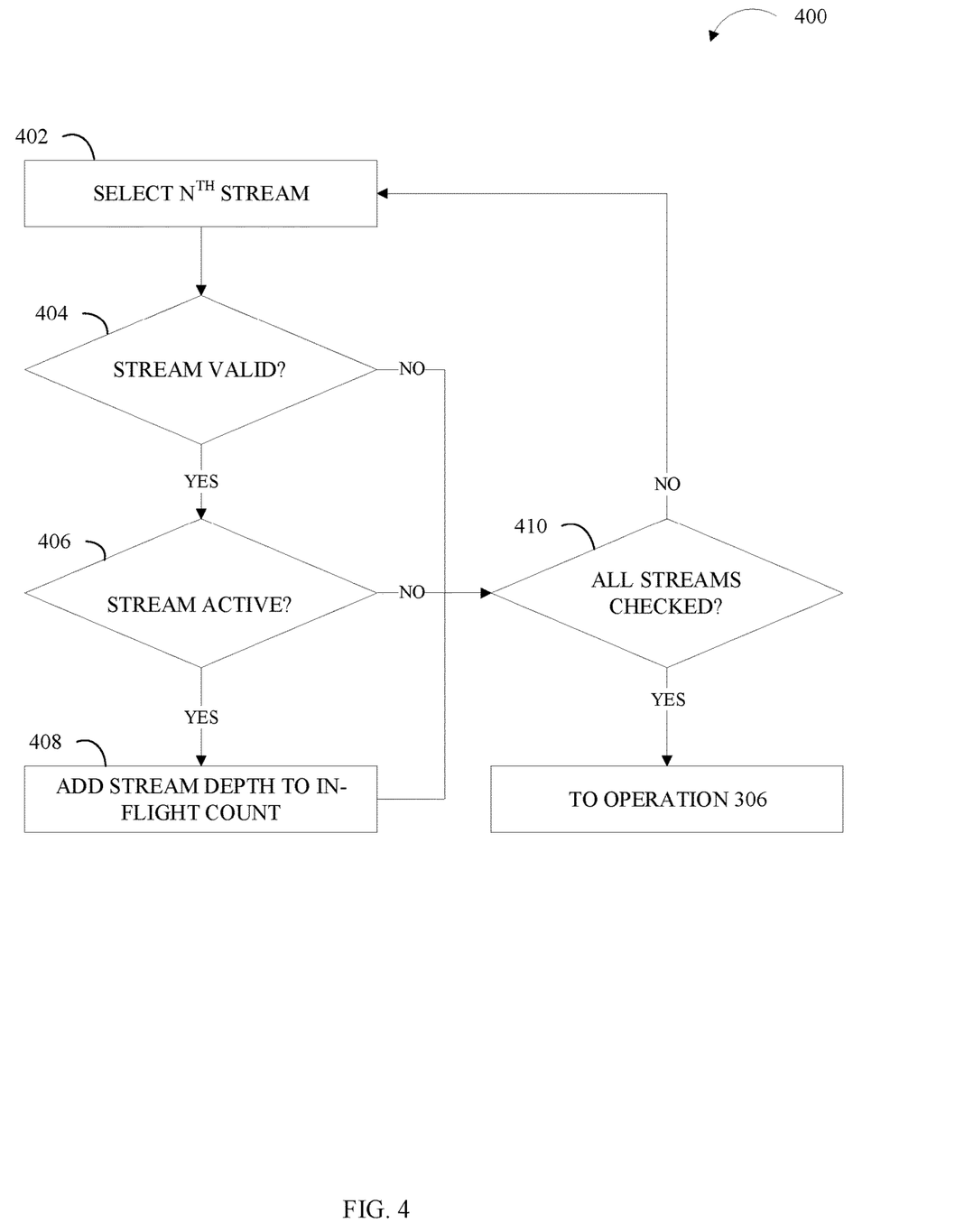
FIG. 4 illustrates a flow chart of an example method of estimating prefetches inflight, in accordance with some embodiments of the present disclosure.
Figure 5:
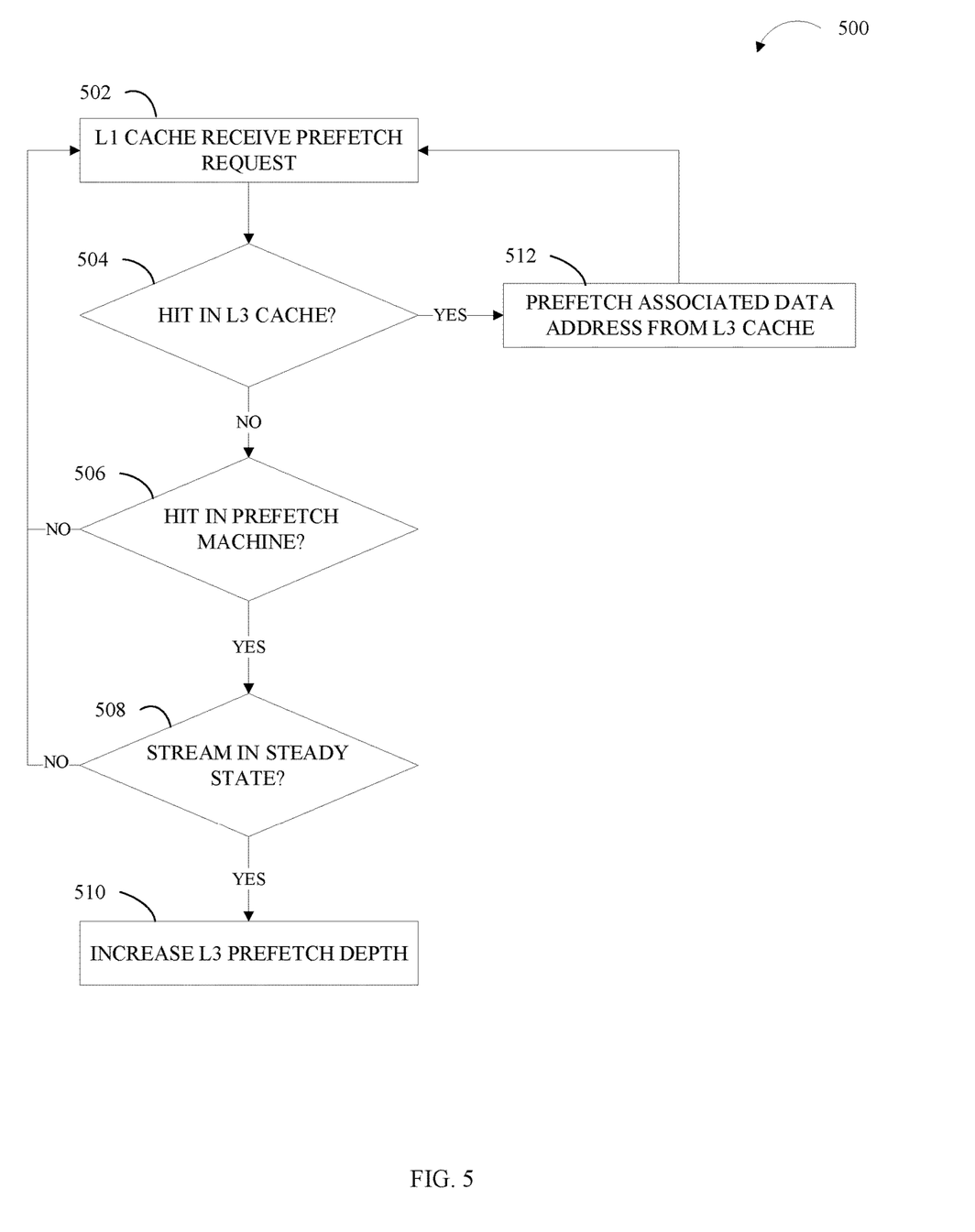
FIG. 5 illustrates a flow chart of an example method of adjusting prefetch depth, in accordance with some embodiments of the present disclosure

FIG. 4 depicts a flowchart of an example method 400, for approximating the number of prefetches inflight that can be performed in a computing environment (e.g., computing environment 100 and/or host device 110). One or more of the advantages and improvements described above adjusting prefetch depth can be realized by the method 400, consistent with various embodiments of the present disclosure.

Method 400 can include more or fewer operations than those depicted. Method 400 can include operations in different orders than the order depicted. Likewise, the method 400 can include operations that occur simultaneously rather than sequentially. Many modifications to the depicted method may be made by those skilled in the art without departing from the spirit and scope of the present disclosure. Method 400 can be implemented by one or more processors, a prefetch system (e.g., prefetch system 105 of FIG. 1), a computing device (e.g., host device 110 of FIG. 1), or a different combination of hardware and/or software. In various embodiments, the various operations of method 400 are performed by one or more of prefetch system 105, host device 110, processor 115, PRQ 120, counter 125, L1 cache 130, L2 cache 135 L3 cache 140, prefetch machines 145 and/or kernel 155. In some embodiments, method 400 is performed as part of operation 304 of FIG. 3.

At operation 402, prefetch system 105 selects the nth stream. In some embodiments, nth stream is an entry in PRQ 120 (e.g., a column in table 200). In some embodiments, the selected stream is the first stream in PRQ 120. In some embodiments, the selected stream is any stream not already counted.

At operation 404, prefetch system 105 determines if the stream is valid. In some embodiments, the stream is valid if the PRQ 120 indicates the stream is valid. Prefetch system 105 can check the value of the stream entry. If the stream is valid (404: YES), then prefetch system 105 proceeds to operation 406. If the stream is not valid (404: NO), then prefetch system 105 proceeds to operation 410.

At operation 406, prefetch system 105 determines if the stream is active. In some embodiments, the stream is active if it has sent out a prefetch request in the previous number of cycles. The number of cycles acts as a set point. Any stream where the last request was sent out fewer cycles ago than the set point can be active. Any stream where the last request was sent out more cycles than the set point can be inactive or not active. Prefetch system 105 can be tuned such that any active stream will send out and have a request completed within a certain number of cycles. Any stream that has gone longer than that to send a request is likely not going to send another request, and by implication not occupying any prefetch machines. It indicates prefetch system 105 will soon invalidate or delete the stream from PRQ 120.

If the stream is active (406: YES), then prefetch system 105 proceeds to operation 408. If the stream is not active (406: NO), then prefetch system 105 proceeds to operation 410.

At operation 408, prefetch system 105 adds the stream depth to the number of prefetches inflight. In some embodiments, operation 408 includes adding a buffer factor. The buffer factor can be added once while counting the entire PRQ (e.g., add 5 to the total number counted), and/or the buffer factor can add a number for each active and valid stream (e.g., add 1 to the stream depth).

At operation 410, prefetch system 105 determines if all streams have been checked. In some embodiments, all streams have been checked if all streams in PRQ 120 have been added to the prefetches inflight count or determined to be invalid/inactive.

If all streams have been checked (decision tree "YES" branch), then method 400 is complete, and in some embodiments, prefetch system 105 proceeds to operation 306 of FIG. 3. If all streams have not been checked (decision tree "NO" branch), then prefetch system 105 returns to operation 402 and selects the next stream.

FIG. 5 depicts a flowchart of an example method, method 500, for prefetch system 105 that can be performed in a computing environment (e.g., computing environment 100 and/or host device 110). One or more of the advantages and improvements described above for adjusting prefetch depth can be realized by the method 500, consistent with various embodiments of the present disclosure.

Method 500 can include more or fewer operations than those depicted. Method 500 can include operations in different orders than the order depicted. Likewise, the method 500 can include operations that occur simultaneously rather than sequentially. Many modifications to the depicted method may be made by those skilled in the art without departing from the spirit and scope of the present disclosure. Method 500 can be implemented by one or more processors, a prefetch system (e.g., prefetch system 105 of FIG. 1), a computing device (e.g., host device 110 of FIG. 1), or a different combination of hardware and/or software. In various embodiments, the various operations of method 200 are performed by one or more of prefetch system 105, host device 110, processor 115, PRQ 120, counter 125, L1 cache 130, L2 cache 135 L3 cache 140, prefetch machines 145 and/or kernel 155.

At operation 502, L1 cache 130 receives a prefetch. In some embodiments, the prefetch request is received from prefetch system 105. In some embodiments, L1 cache 130 is the highest level of cache in host device 110. The prefetch request can be to prefetch from any lower level cache, however, L3 cache 140 will be used as an example. In some embodiments, the prefetch request is based on data stored in PRQ 120. L1 cache 130 may include dedicated hardware for tracking and executing the prefetch request (e.g., a prefetch machine). However, in some embodiments, L1 cache 130 may share resources of other components in the sequence of demand (e.g., processor 115, prefetch system 105, kernel 155, and/or other components not pictured).

At operation 504, prefetch system 105 determines if the prefetch hits in L3 cache 140. The request will hit if the associated line of data has been written into L3 cache 140. If there is a cache hit (decision tree "YES" branch), then prefetch system 105 proceeds to operation 512. If there is a cache miss (decision tree "NO" branch), then prefetch system 105 proceeds to operation 506.

At operation 506, prefetch system 105 determines if the prefetch request hits in one of prefetch machines 145. The request will hit in the prefetch machine if prefetch of the same data line into L3 cache 140 is in flight (requested but not yet completed). This signals that the L3 prefetch was sent to the correct data address but was not sent early enough. If prefetch system 105 hits in a prefetch machine (decision tree "YES" branch), then prefetch system 105 proceeds to operation 508. If prefetch system 105 does not hit in a prefetch machine (decision tree "NO" branch), then prefetch system 105 returns to operation 502.

A miss at operation 504 and operation 506 can be for several reasons. Thus, prefetch system 105 returns to operation 502 and does not guess the cause at this point. Other portions and method of prefetch system 105 can be used to remedy any inefficiencies. Causes of the misses may include a prefetch stream that is too deep, not deep enough, the lower level prefetcher not fetching the correct line of data, etc. If the depth of the lower level prefetch is too deep, it is possible the data has been prefetched and subsequently flushed out of L3 cache 140 prior to upper level prefetcher initiating the prefetch. In this case, if the lower level prefetch depth is increased, it can cause additional misses of this type to occur. If the depth of the lower level prefetch is very short and/or there are more inflight prefetches than available prefetch machines, the lower level prefetch may be stored upstream of the prefetch machines, but still causing misses. Increasing the depth in this scenario would also have no benefit, and the bottleneck in the system would not be reduced in any way. However, utilizing various operations of method 300 (e.g., reducing the depth of one or more streams) may reduce the bottleneck. Prefetches from the lower level prefetcher are more speculative than prefetches from the higher level prefetcher. It is possible that the lower level prefetcher did not prefetch the correct line of data, but rather prefetched additional non-useful lines of data.

At operation 508, prefetch system 105 determines if the current stream is in steady state. In some embodiments, a stream is at steady state if it fetches the X+N line when X is being processed. In some embodiments, a stream is at steady state if it has been prefetching at the current depth for greater than a predefined set point. The setpoint can be number of cycles (e.g., 1000 cycles since depth change), number of fetches, and/or other similar factors. If a stream has recently been added to PRQ 120 and/or the depth of the stream has been changed, it takes a certain amount of time to ramp up/down to the new depth. If the depth is changed during the ramp, this may lead to undesirable results. For example, a stream may constantly be changed, and never have changed to its optimal depth.

If the stream is in steady state (decision tree "YES" branch), prefetch system 105 proceeds to operation 510. If the stream is not in steady state (decision tree "NO" branch), then prefetch system 105 returns to operation 502.

At operation 510, prefetch system 105 increases the L3 cache prefetch depth. The depth can be increased by any amount (e.g., 1, 2, 8, etc.). In some embodiments, the depth increase is based on the number of available prefetch machines. In some embodiments, the depth increase is based on the number of active streams being prefetched. In some embodiments, the depth increase is carried out in cooperation with method 300. For example, once method 500 determines a first stream depth should be increased, prefetch system 105 can run method 300 to determine the number of available machines and/or which stream depths can be reduced to accommodate the needed increase.

At operation 512, prefetch system 105 prefetches the associated line of data from L3 cache 140 to L1 cache 130. In these embodiments, prefetch system 105 returns to operation 504. The correct timing of dual prefetching system can be validated during each fetch from a lower level cache to the highest-level cache.

Figure 6:
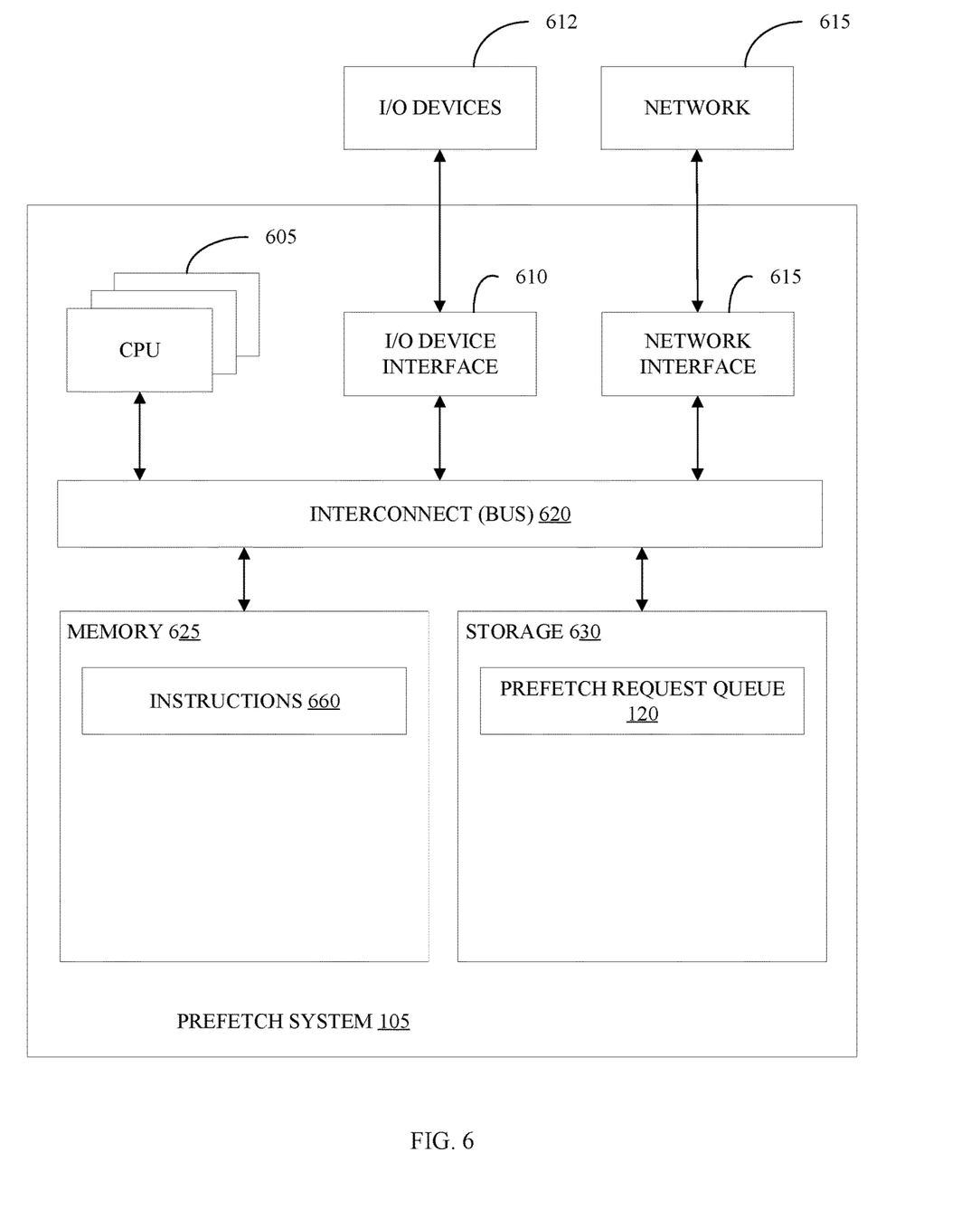
FIG. 6 illustrates a block diagram of an example prefetch system, in accordance with various embodiments of the present disclosure.

FIG. 6 illustrates a block diagram of an example prefetch system 105 in accordance with some embodiments of the present disclosure. In some embodiments, prefetch system 105 can perform the methods 300-500 as described in FIGS. 3-5. In some embodiments, prefetch system 105 provides instructions for any of the methods 300-500 of FIGS. 3-5 to a client machine such that the client machine executes the method, or a portion of the method, based on the instructions provided by the prefetch system 105.

The prefetch system 105 includes a memory 625, storage 630, an interconnect 620 (e.g., BUS), one or more CPUs 605 (also referred to as processors herein), an I/O device interface 610, I/O devices 612, and a network interface 615.

Each CPU 605 retrieves and executes programming instructions stored in the memory 625 or storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in some embodiments. In some embodiments, a CPU 605 can be a digital signal processor (DSP). In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP CPU configurations). Memory 625 is generally included to be representative of a nonvolatile memory, such as a hard disk drive, solid state device (SSD), removable memory cards, optical storage, or flash memory devices. In an alternative embodiment, the storage 630 can be replaced by storage area-network (SAN) deices, the cloud, or other devices connected to the prefetch system 105 via the I/O device interface 610 or a network 650 via the network interface 615.

In some embodiments, the memory 625 stores instruction 660 and the storage 630 stores PRQ 120. However, in some embodiments, the instructions 660, and PRQ 120 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all of, any of the methods 300-500 of FIGS. 3-5.

In some embodiments, the I/O devices 612 include an interface capable of presenting information and receiving input. For example, I/O device 612 can present information to a user interacting with prefetch system 105 and receive input from the user.

Prefetch system 105 is connected to the network 650 via the network interface 615. Network 650 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instruction can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instruction can also be stored in a computer readable storage medium that can direct a computer, a programmable data processing apparatus, and/or other devices to function in a particular manner, such that the computer readable storage medium having instructions stored therein comprises an article of manufacture including instructions which implement aspect of the function/act specified in the flowchart and/or block diagram block or blocks.

The computer readable program instruction can also be loaded onto a computer, other programmable data processing apparatus, or other device to cause a series of operations steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams can represent a module, segment, or subset of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 3-5) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

What is claimed is:

1. A computer-implemented method comprising:
    sending, to a first prefetch machine, a first prefetch request, wherein the first prefetch request is configured to fetch a first data address from a first stream at a first depth to a lower level cache;
    sending, to a second prefetcher, a second prefetch request, wherein the second prefetch request is configured to fetch the first data address from the first stream at a second depth to a highest-level cache;
    determining the first data address is not in the lower level cache;
    determining, in response to the first data address not being in the lower level cache, that the first prefetch request is in the first prefetch machine, wherein the first prefetch machine is one of a plurality of prefetch machines;
    determining, in response to the first prefetch request being in the first prefetch machine, that the first stream is at a steady state, wherein the determining that the first stream is at steady state further comprises determining the first depth has been constant for a predetermined number of cycles; and
    adjusting, in response to determining that the first stream is at the steady state, the first depth.

2. The computer-implemented method of claim 1, wherein the first depth is greater than the second depth.

3. The computer-implemented method of claim 1, wherein the first prefetch request and the second prefetch request are part of the first stream.

4. The computer-implemented method of claim 3, wherein a prefetch request queue includes an entry for the first stream, and wherein the entry includes, a stream identifier, a stream validity identifier, a stream depth, a number of cycles since last prefetch, and at least one associated data address.

5. The computer-implemented method of claim 1, wherein the adjusting of the first depth further comprises increasing the first depth.

6. The computer-implemented method of claim 5, further comprising:
    determining, all of the plurality of prefetch machines contain a prefetch request; and
    reducing a third prefetch depth, wherein the third prefetch depth is associated with a second stream.

7. The computer implemented method of claim 6, wherein the first stream and the second stream are included in a plurality of streams, and wherein a summation of each depth of each stream of the plurality of streams is equal to a number prefetch machines in the plurality of prefetch machines.

8. A system comprising:
    a processor; and
    a computer-readable storage medium communicatively coupled to the processor and storing program instructions which, when executed by the processor, are configured to cause the processor to perform a method comprising:
        sending, to a first prefetch machine, a first prefetch request, wherein the first prefetch request is configured to fetch a first data address from a first stream at a first depth to a lower level cache;
        sending, to a second prefetcher, a second prefetch request, wherein the second prefetch request is configured to fetch the first data address from the first stream at a second depth to a highest-level cache, wherein the first prefetch request and the second prefetch request are part of the first stream and wherein a prefetch request queue includes an entry for the first stream, and wherein the entry includes, a stream identifier, a stream validity identifier, a stream depth, a number of cycles since last prefetch, and at least one associated data address;
        determining the first data address is not in the lower level cache;
        determining, in response to the first data address not being in the lower level cache, that the first prefetch request is in the first prefetch machine, wherein the first prefetch machine is one of a plurality of prefetch machines;
        determining, in response to the first prefetch request being in the first prefetch machine, that the first stream is at steady state; and
        adjusting, in response to determining that the first stream is at steady state, the first depth.

9. The system of claim 8, wherein the first depth is greater than the second depth.

10. The system of claim 8, wherein adjusting the first depth further comprises increasing the first depth.

11. The system of claim 10, wherein the program instructions are further configured to cause the processor to perform operations further comprising:
    determining, all of the plurality of prefetch machines contain a prefetch request; and
    reducing a third prefetch depth, wherein the third prefetch depth is associated with a second stream.

12. A computer program product, the computer program product comprising a computer readable storage medium having program instructions embodied therewith, the program instructions executable by a processing unit to cause the processing unit to perform a method comprising:

sending, to a first prefetch machine, a first prefetch request, wherein the first prefetch request is configured to fetch a first data address from a first stream at a first depth to a lower level cache;

sending, to a second prefetcher, a second prefetch request, wherein the second prefetch request is configured to fetch the first data address from the first stream at a second depth to a highest-level cache;

determining the first data address is not in the lower level cache;

determining, in response to the first data address not being in the lower level cache, that the first prefetch request is in the first prefetch machine, wherein the first prefetch machine is one of a plurality of prefetch machines;

determining, in response to the first prefetch request being in the first prefetch machine, that the first stream is at steady state;

adjusting, in response to determining that the first stream is at steady state, the first depth, wherein the adjusting of the first depth further comprises increasing the first depth;

determining, all of the plurality of prefetch machines contain a prefetch request; and reducing a third prefetch depth, wherein the third prefetch depth is associated with a second stream.

13. The computer program product of claim 12, wherein the first depth is greater than the second depth.

14. The computer program product of claim 12, wherein the first prefetch request and the second prefetch request are part of the first stream.

15. The computer program product of claim 14, wherein a prefetch request queue includes an entry for the first stream, and wherein the entry includes, a stream identifier, a stream validity identifier, a stream depth, a number of cycles since last prefetch, and at least one associated data address.

* * * * *